United States Patent [19]

Lallemand

[11] Patent Number: 5,157,586
[45] Date of Patent: Oct. 20, 1992

[54] SEPARATOR FOR ELECTROLYTIC CAPACITORS, AND CAPACITORS MADE THEREWITH

[75] Inventor: Denis Lallemand, Saint Thurien, France

[73] Assignee: Bollore Technologies, Quimper, France

[21] Appl. No.: 826,077

[22] Filed: Jan. 27, 1992

[30] Foreign Application Priority Data

Jan. 28, 1991 [FR] France ................ 91 00921

[51] Int. Cl.$^5$ .................. H01G 4/16; H01G 3/195
[52] U.S. Cl. ................................ 361/324; 361/503
[58] Field of Search ................ 361/502–507, 361/512, 524–527, 324, 314–318, 323

[56] References Cited

U.S. PATENT DOCUMENTS

| 4,914,48 | 4/1990 | Kubo et al. ................ 361/324 |
| 2,199,447 | 5/1942 | Ruben ................ 29/25.03 X |
| 2,288,157 | 6/1942 | Dunleavey et al. ........... 361/523 |
| 3,584,272 | 6/1971 | Martin ................ 361/314 |
| 4,580,191 | 4/1986 | Cansell et al. ............ 361/323 |

FOREIGN PATENT DOCUMENTS

| 913452 | 6/1954 | Fed. Rep. of Germany . |
| 976481 | 10/1963 | Fed. Rep. of Germany . |
| 2391536 | 12/1978 | France . |
| 20012 | 1/1990 | Japan . |
| 1542575 | 3/1979 | United Kingdom . |

OTHER PUBLICATIONS

Electrochemical Technology vol. 6, No. 5–6, Jun. 1968, pp. 172–178.

Primary Examiner—Donald G. Griffin
Attorney, Agent, or Firm—Blakely, Sokoloff, Taylor & Zafman

[57] ABSTRACT

A separator for electrolytic capacitors, the separator being constituted by a single sheet of paper made up of at least two asymmetrical superposed layers: one of the layers having high thickness and low density, the other layer having low thickness and high density.

13 Claims, 5 Drawing Sheets

3 × 50 μm THICK SHEETS OF PAPER DENSITY 0.45

2 × 50 μm THICK SHEETS OF PAPER DENSITY 0.3 +
1 × 20 μm THICK SHEETS OF PAPER DENSITY 0.8

FIG. 4 — ELECTROLYTIC CAPACITORS HAVING THE SAME PHYSICAL DIMENSIONS

| | THICKNES $e\ (\mu m)$ | QUANTITY OF ELECTROLYTE $(E)$ | SERIES RESISTANCE $R_s\ (m\Omega)$ (100 KHz - 40°C) |
|---|---|---|---|
| CONVENTIONAL SEPARATOR 2 50 μm FILMS DENSITY 0.45 | 100 | 7.06 | 17.4 |
| CONVENTIONAL SEPARATOR 2 40 μm FILMS DENSITY 0.45 + 1 20 μm FILM DENSITY 0.8 | 100 | 6.60 | 36 |
| CONVENTIONAL SEPARATOR 1 60 μm FILM DENSITY 0.3 + 2 20 μm FILMS DENSITY 0.8 | 100 | 6.72 | 51 |
| INVENTION 1 FILM COMPRISING 1 90 μm COUCHE DENSITY 0.3 + 1 10 μm COUCHE DENSITY 0.8 | 100 | 7 72 | 20 |

FIG. 5 — ELECTROLYTIC CAPACITORS HAVING THE SAME QUANTITY OF ELECTROLYTE

| | THICKNES e (μm) | QUANTITY OF ELECTROLYTE (E) | SERIES RESISTANCE $R_s$ (mΩ) (100 KHz - 40°C) |
|---|---|---|---|
| CONVENTIONAL SEPARATOR 2 46.75 μm FILMS DENSITY 0.45 | 93 5 | 6.60 | 16 3 |
| CONVENTIONAL SEPARATOR 2 40 μm FILMS DENSITY 0.45 + 1 20 μm FILM DENSITY 0.8 | 100 | 6.60 | 36 |
| CONVENTIONAL SEPARATOR 1 58 μm FILM DENSITY 0.3 + 2 20 μm FILMS DENSITY 0.8 | 98 | 6.60 | 50 |
| INVENTION 1 FILM COMPRISING 1 76 μm COUCHE DENSITY 0.3 + 1 10 μm COUCHE DENSITY 0.8 | 86 | 6.60 | 18 |

FIG. 6 - ELECTROLYTIC CAPACITORS HAVING THE SAME SERIES RESISTANCE

| | THICKNES $e\ (\mu m)$ | QUANTITY OF ELECTROLYTE $(E)$ | SERIES RESISTANCE $R_b\ (m\Omega)$ (100 KHz - 40°C) |
|---|---|---|---|
| CONVENTIONAL SEPARATOR 3 60 μm FILMS DENSITY 0.3 | 180 | 14.47 | 20 |
| CONVENTIONAL SEPARATOR 2 60 μm FILMS DENSITY 0.45 | 120 | 8.47 | 20 |
| CONVENTIONAL SEPARATOR 1 20 μm FILM DENSITY 0.8 | 20 | 0.95 | 20 |
| INVENTION 1 FILM COMPRISING 1 90 μm COUCHE DENSITY 0.3 + 1 10 μm COUCHE DENSITY 0.8 | 100 | 7.72 | 20 |

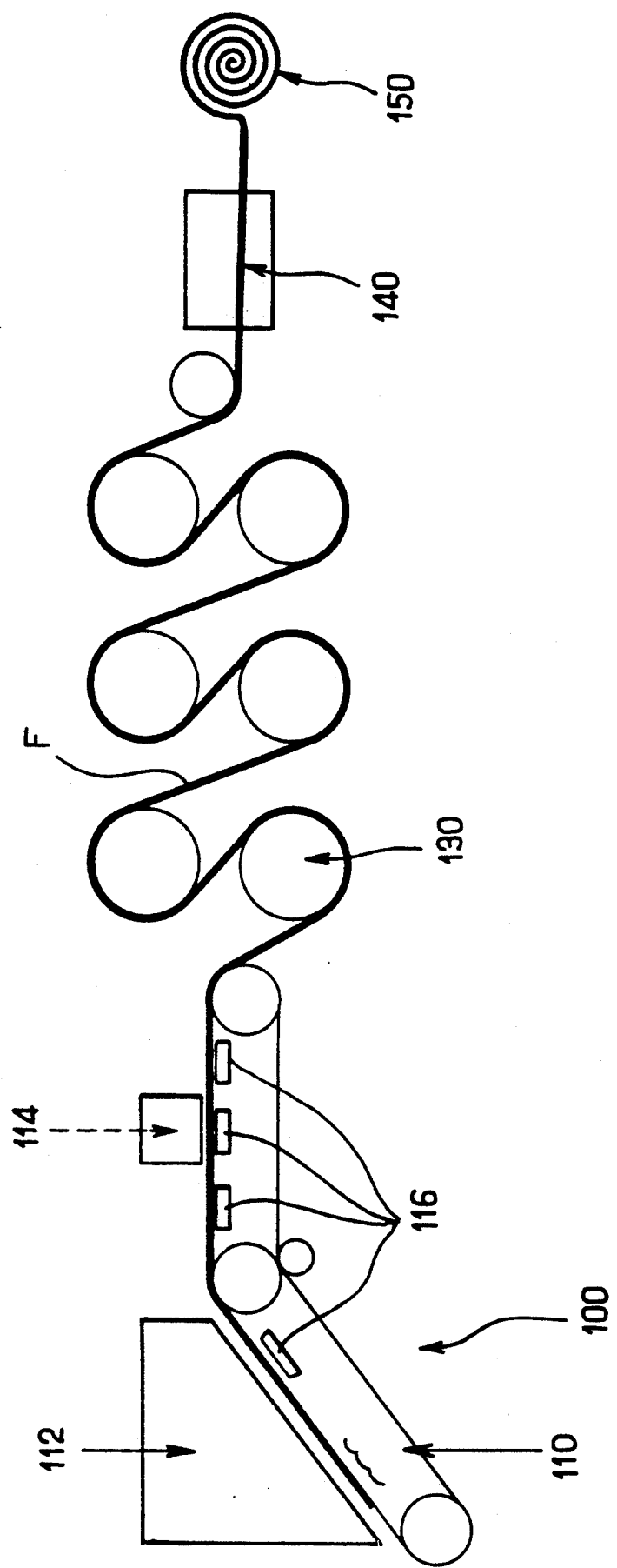
FIG_7

SEPARATOR FOR ELECTROLYTIC CAPACITORS, AND CAPACITORS MADE THEREWITH

The present invention relates to separators for electrolytic capacitors, and to electrolytic capacitors per se.

BACKGROUND OF THE INVENTION

The term "separator for an electrolytic capacitor" is commonly used to designate a storage member containing liquid electrolyte that constantly impregnates both of the capacitor electrodes (the anode and the cathode). The invention is particularly applicable to electrolytic capacitors used at operating voltages of more than 100 volts DC. The invention is equally applicable to electrolytic capacitors used at any voltage with alternating current, sinusoidal or otherwise.

Conventional separators in use nowadays for manufacturing electrolytic capacitors are generally made of one or more sheets of paper or films of paper. These sheets of paper are of different thicknesses and/or densities depending on which final characteristics are of most concern. The general procedure used for defining the thickness and the density of the various sheets of paper used is as follows.

For a capacitor in which lifetime is of major concern, the separator is made from a plurality of thick sheets. The space available between the electrodes is at a maximum, thereby enabling it to contain a maximum amount of electrolyte; however this penalizes physical dimensions which become very large.

For a capacitor in which the major concern is low series resistance, the separator is made of a small number of low-density sheets. The "visibility" between the electrodes is then at a maximum, but this is particularly to the detriment of lifetime due to lack of electrolyte and/or to electric arcs being struck.

For a capacitor in which the major concern is small physical dimensions, the separator is thin and dense, to the detriment of its series resistance and of its lifetime.

It will be understood from reading the above that although the separators on offer heretofore enable an important parameter to be enhanced, this is generally to the detriment of other parameters that are not negligible.

Other solutions that are slightly different from the above-specified situations have also been proposed.

Thus, for example, proposals have been made for so-called "duplex" papers made up of various identical layers of cellulose.

Papers have also been proposed made up of a mixture of cellulose fibers and of synthetic fibers in a single-layer mass. Such papers have the particular advantage of lowering series resistance.

Other substitutions have also been attempted, by including various fillers in the paper, by assembling the paper with a film having microperforations, by impregnating the paper, or by adding a film thereto. Nevertheless, such substitutions have not so far replaced the usual separators as described above.

Accompanying FIG. 1 is a diagram showing a first type of commonly-used separator. FIG. 1 shows a separator 10 placed between an anode 1 and a cathode 2. The separator 10 comprises three sheets of paper 11, 12, and 13, and more precisely three sheets of paper 11, 12, and 13 each having a thickness of 50 μm and a relative density of 0.45.

A second type of separator in common use is shown diagrammatically in FIG. 2. FIG. 2 shows a separator 20 placed between an anode 1 and a cathode 2. The separator 20 comprises three superposed sheets of paper 21, 22, and 23, and more precisely two sheets 21 and 22 of thickness 50 μm and of relative density 0.3, and one sheet of paper 23 of thickness 20 μm and of relative density 0.8.

Overall, the separators proposed in the past have given good service. However they do not give full satisfaction.

An object of the present invention is to provide a novel separator for an electrolytic capacitor enabling electrolytic capacitors to be made which are suitable for operating under high voltage, while nevertheless improving the characteristics of the capacitor, in particular with respect to its physical dimensions, its lifetime, and its series resistance.

SUMMARY OF THE INVENTION

According to the present invention, this object is achieved by a separator constituted by a single sheet of paper made up of at least two asymmetrical superposed layers: one of the layers has high thickness and low density, while the other layer has low thickness and high density.

Advantageously, the relative density of the first layer is less than 0.7.

Advantageously, the relative density of the second layer is greater than 0.4, and is preferably greater than 0.7.

Advantageously, the first layer is made of cellulose fibers.

Advantageously, the second layer is made of cellulose fibers and/or synthetic fibers.

Advantageously, the thickness of the second layer is less than one-third of the total thickness of the separator.

BRIEF DESCRIPTION OF THE DRAWINGS

An embodiment of the invention is described by way of example with reference to the accompanying drawings, in which:

FIG. 4 is a table giving the thickness of the separator, the quantity of electrolyte contained therein, and its series resistance for three conventional separators and for a separator in accordance with the present invention, as applicable to electrolytic capacitors having the same physical dimensions;

FIG. 5 is a table giving the same parameters for electrolytic capacitors that contain the same quantity of electrolyte;

FIG. 6 is a table giving the same parameters for electrolytic capacitors having the same series resistance; and FIG. 7 is a diagram of an installation for manufacturing a separator in accordance with the present invention.

DETAILED DESCRIPTION

Figure 1:
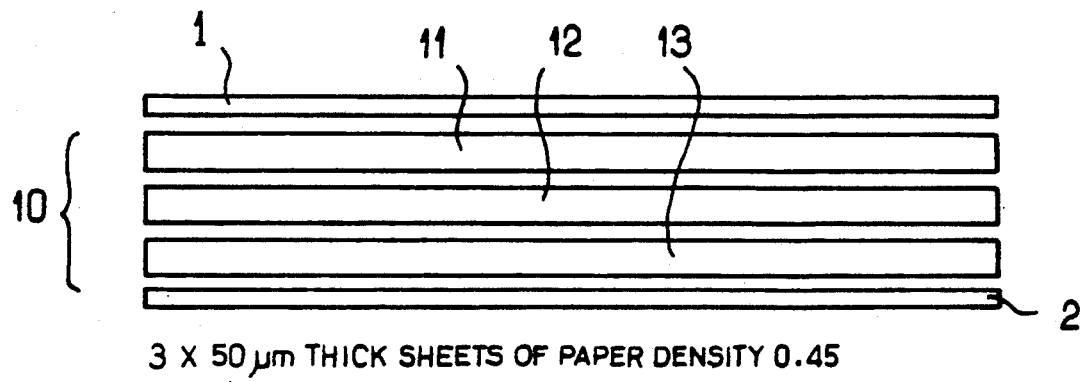
FIGS. 1 and 2 are described above and are diagrams showing two prior art separators for electrolytic capacitors.
Figure 2:
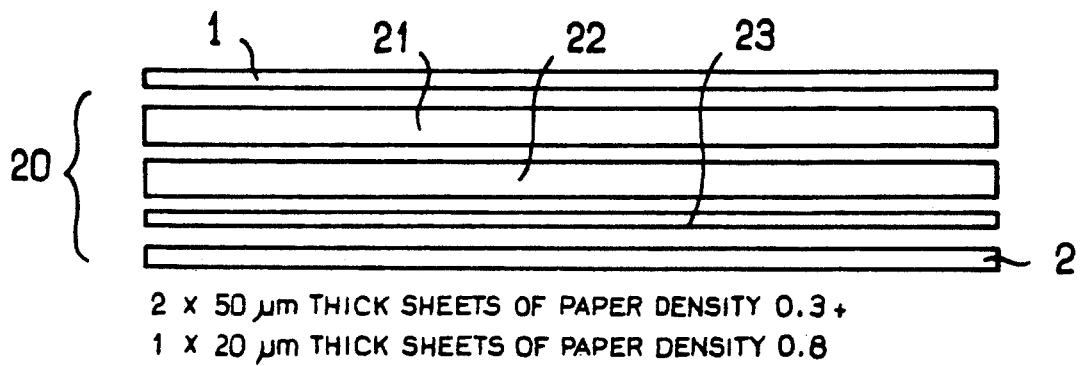
Figure 3:
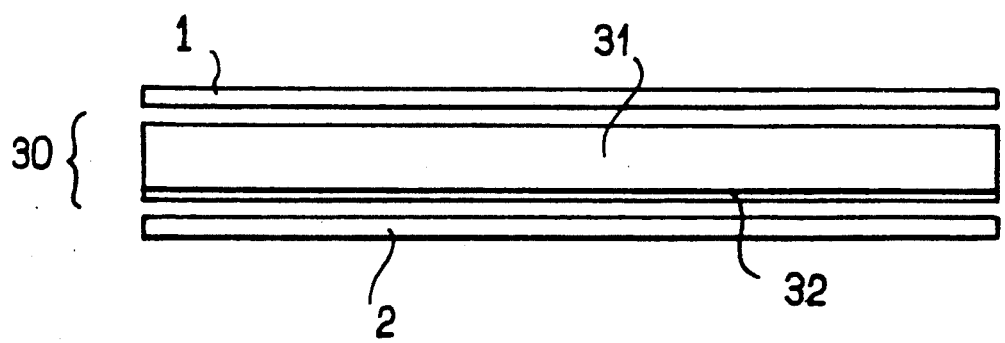
FIG. 3 is a diagram of a separator in accordance with the invention for electrolytic capacitors.

A separator in accordance with the present invention for electrolytic capacitors is shown diagrammatically in accompanying FIG. 3.

FIG. 3 shows a separator 30 placed between an anode 1 and a cathode 2.

According to the present invention, and as mentioned above, the separator 3 comprises a single sheet of paper made up of at least two asymmetrical superposed layers 31 and 32. The first layer 31 is of high thickness and low density. The second layer 32 is of low thickness and high density.

More precisely, the first layer 31 is advantageously made of cellulose fibers and has a relative density of less than 0.7.

The second layer 32 is made of cellulose fibers and/or of synthetic fibers. Its relative density is greater than 0.4, and is most preferably greater than 0.7, and the thickness of this layer 32 is preferably less than one-third of the total thickness of the separator 30.

The overall relative density of the two-layer separator of the present invention lies in the range 0.20 to 0.9.

Capacitors obtained using a separator of the present invention are compared with prior art capacitors based on the three above-mentioned parameters: lifetime; overall physical dimensions; and series resistance.

The influence of the separator on these three important parameters can be seen from the following.

Assuming that the physical size of the electrodes is constant, then it is the thickness e of the separator that has the most influence on the final overall physical dimensions. The thicker the separator, the bulkier the capacitor.

The series resistance is a function of the resistance factor A that can be measured directly on a separator using known methods. There exists an equation: $Rs = \rho eA/S$, in which:

Rs is the series resistance of the separator;
$\rho$ is the resistivity of the electrolyte;
e is the thickness of the separator;
S is the surface area of the anode electrode or of the cathode electrode; and
A is the resistance factor.

For capacitors having the same capacitance and made using the same electrolyte, measuring the series resistance of a finished capacitor gives a good idea of the resistance factor of the separator. In general, for capacitors that are used at voltages of greater than 100 volts DC, it is important that the series resistance of the capacitor should not be too low. If it is low, then the resistance to the passage of electrical current becomes too low to prevent electrical arcs being struck which destroy the capacitor, and the proportion of faulty capacitors becomes unacceptable.

Lifetime is limited essentially by electric arcs that are struck between the electrodes and that destroy the capacitor. In an electrolytic capacitor having a dielectric layer that is properly formed initially, arcs do not occur so long as the dielectric layer is kept in proper condition by the liquid electrolyte. Lifetime is thus a function of the quantity of electrolyte contained in the capacitor. The greater the quantity of electrolyte, the longer the lifetime. The quantity of the electrolyte is itself a function of the space available between the opposite-sign electrodes, and is thus proportional to the thickness of the separator and is inversely proportional to its density. These two characteristics, namely separator thickness and separator density, enable the space available between the electrodes to be evaluated.

Since the relative density of cellulose fiber is 1.53, the apparent density of the separator gives an idea on the percentage empty space that exists within the structure of the paper.

This empty space percentage is given by $100(1 - d/1.53)$ in which equation d represents the apparent relative density.

The available empty space percentage is then proportional to thickness. This gives $E = 100e(1 - d/1.53)$ in which equation E represents the available space and e represents the thickness of the separator in mm.

Without taking the characteristics of the liquid electrolyte into consideration, the best capacitor is that in which, inter alia, the series resistance is lowest, the volume is smallest, and the lifetime is longest. The best separator is therefore a separator that provides the best comprise between thickness e, available empty space E, and series resistance Rs.

In other words, the compromise can be summed up as follows:

for an optimum capacitor: maximum lifetime, low series resistance, and small size; or for an optimum separator: maximum available empty space for electrolyte, low factor A, and minimum thickness.

The main characteristic of the separator of the invention is its asymmetry which enables two of the above-mentioned three parameters to be separated, namely E and A.

The parameter E is given mainly by the first layer 31 of the separator. The fact that it is made of low density cellulose fibers gives it great absorbing power, thereby optimizing the empty space available between the electrodes 1 and 2. The first layer 31 thus serves essentially to store electrolyte. Its resistance factor A is low.

In contrast, the resistant factor A is given mainly by the second layer 32. The high density and low thickness of this layer are designed to determine this factor. Since the available empty space in a high density paper is low, the thickness of the layer 32 is kept as small as possible so as to avoid occupying the separator with material having a low amount of available empty space.

To obtain a better understanding of the advantages of the separator of the present invention compared with prior art separators, reference may be made to FIGS. 4, 5, and 6. These tables are tables comparing typical values for the above-mentioned parameters: separator thickness e, quantity of electrolyte E, and series resistance Rs for four different capacitors.

In each of these tables, the first three lines relate to conventional separators and the last line relates to a separator of the present invention.

More particularly, the table given in FIG. 4 concerns electrolytic capacitors all having the same physical dimensions, thus enabling series resistances and quantities of electrolyte to be compared.

The table given in FIG. 5 corresponds to four capacitors all containing the same quantity of electrolyte, thus enabling physical dimensions and series resistances to be compared.

Finally, the table given in FIG. 6 corresponds to four capacitors all having the same series resistance, thus making it possible to compare physical dimensions and quantities of electrolyte.

All of these capacitors are wound using the same electrodes and impregnated using the same liquid electrolyte. The method of manufacturing the windings is likewise the same. The only differences lie in the numbers and the qualities of separators used.

The electrodes used are as follows: the anode is made of 99.99 titer etched aluminum anodically formed at 600 volts, having a thickness of 90 μm. The thickness of the cathode is 30 μm and it is made of 98% aluminum.

The liquid electrolyte contained in the housings is a butryolactone-based liquid for high tension.

More precisely, in FIG. 4:

the conventional separator mentioned in the first line comprises two films of thickness 50 μm and of relative density about 0.45;

the conventional separator mentioned in the second line comprises two films of thickness 40 μm and of relative density about 0.45, and one film of thickness 20 μm and of relative density about 0.8;

the conventional separator mentioned in the third line comprises one film of thickness 60 μm and of relative density about 0.3, and two films of thickness 20 μm and of relative density about 0.8; and the separator of the present invention mentioned in the fourth line comprises a film having a layer of thickness 90 μm and of relative density about 0.3 and a layer of thickness 10 μm and of relative density about 0.8.

In FIG. 5:

the conventional separator mentioned in the first line comprises two films of thickness 46.75 μm and of relative density about 0.45;

the conventional separator mentioned in the second line comprises two films of thickness 40 μm and of relative density about 0.45, and one film of thickness 20 μm and of relative density about 0.8;

the conventional separator mentioned in the third line comprises one film of thickness 58 μm and of relative density about 0.3, and two films of thickness 20 μm and of relative density about 0.8; and the separator of the present invention mentioned in the fourth line comprises a film having a layer of thickness 76 μm and of relative density about 0.3 and a layer of thickness 10 μm and of relative density about 0.8.

In FIG. 6:

the conventional separator mentioned in the first line comprises three films of thickness 60 μm and of relative density about 0.3;

the conventional separator mentioned in the second line comprises two films of thickness 60 μm and of relative density about 0.45;

the conventional separator mentioned in the third line comprises one film of thickness 20 μm and of relative density about 0.8; and the separator of the present invention mentioned in the fourth line comprises a film having a layer of thickness 90 μm and of relative density about 0.3 and a layer of thickness 10 μm and of relative density about 0.8.

The following conclusions can be drawn from a comparison of the results obtained and listed in the tables of FIGS. 4, 5, and 6.

In all three case, the separator of the present invention is constituted by a single film. It is thus a great deal more practical for winding than are the prior art separators which generally comprise a plurality of superposed films.

It may be observed that although the separator is asymmetrical, the Applicant has observed no change in series resistance when the separator is wound the other way round.

The table of FIG. 4 shows that for equal separator thicknesses, the separator of the present invention makes it possible to obtain a larger quantity of electrolyte between the electrodes for a series resistance that is low and acceptable.

The table of FIG. 5 shows that for equal quantities of electrolyte, the separator of the present invention makes it possible to obtain smaller physical dimensions in association with very low series resistance. In this case, since the series resistance is limiting, the separator may be further optimized if necessary. Increasing the thickness of the layer 39 by a few μm enables the assembly to be given the desired series resistance without greatly increasing its overall physical dimensions.

Finally, the table of FIG. 6 corresponds to the various different capacitors having the same series resistance. For the capacitor identified in the third line, the quantity of electrolyte is too small to be acceptable.

Ignoring that type of separator, it can be seen that the separator of the present invention has the smallest physical dimensions and also the smallest quantity of electrolyte. However, this quantity is nevertheless sufficient and, in this respect, the separator identified in the first line tends towards having too much.

To sum up the above, if the separator of the present invention is compared with other types of previously existing separator, it is clear that the single-film but two-layer separator of the present invention provides a sufficient quantity of electrolyte together with reduced physical dimensions, and series resistance that is low and acceptable.

The following advantages resulting from the separator of the present invention may also be mentioned.

Since the layer 32 of the separator is placed on the layer 31, it is possible to give the layer 32 a thickness that is smaller than would theoretically have been possible in a conventional capacitor where the various layers of the separator are separate.

This makes it possible to limit physical size, and above all to limit series resistance which increases very quickly with thickness at high densities.

The separators generally used having density greater than 0.7 provide the series resistance and are made of papers that are mainly constituted by Kraft pulps. Such pulps still contain a non-negligible amount of lignin and of hemicellulin which do not withstand attack from electrolytes. Such separators decompose rapidly and loose series resistance. They can then no longer prevent flashovers.

In contrast, the new separator of the present invention having a single film but made up of two layers is advantageous on this point. The synthetic fibers contained in the layer 32 withstand electrolytes and maintain series resistance over time.

The invention is not limited to the electrodes described above and to liquid electrolytes based on buytrolactone. Analogous results are obtained using other electrodes and other electrolytes.

For use at operating voltages greater than or equal to 350 volts DC, the layer 32 of the separator may be slightly increased in thickness in order to obtain sufficient series resistance. The single-film and two-layer separator still remains less bulky than previously known separators.

Naturally the present invention is not limited to the particular embodiments described above.

In particular, the present invention is not limited to making a separator having two layers. It is equally possible to make single-film separators having three layers without going beyond the scope of the present invention.

By making the various layers of a separator in the form of a single sheet, subsequent winding of the capacitor is greatly facilitated.

The multi-layer, single-film separator of the present invention can be made using the installation shown diagrammatically in FIG. 7.

FIG. 7 shows diagrammatically a first station 100 having an endless cloth 110. Two boxes 112 and 114 are placed over the cloth 110. The first box 112 contains relatively unrefined fibers to form the first layer 31 of the separator. The second box 114 contains relatively more refined fibers of cellulose and/or of synthetic material for forming the second layer 32 on the first layer 31. Suction boxes are placed beneath the cloth 110 in conventional manner. In FIG. 7, the suction boxes are referenced 116.

The station 100 is followed by a station 130 made up of various different rollers between which the film F passes. The film F is finally directed to a station 140 designed to crosslink the film F without altering its porosity. The film is then wound onto a winder 150.

Naturally the present invention is not limited to the embodiments described above, but extends to any variants coming within its spirit.

I claim:

1. A separator for electrolytic capacitors, the separator being constituted by a single sheet of paper made up of at least two asymmetrical superposed layers: one of the layers having high thickness and low density, the other layer having low thickness and high density.

2. A separator according to claim 1, wherein the relative density of the first layer is less than 0.7.

3. A separator according to claim 1, wherein the relative density of the second layer is greater than 0.4, and is preferably greater than 0.7.

4. A separator according to claim 1, wherein the first layer is made of cellulose fibers.

5. A separator according to claim 1, wherein the second layer is made of cellulose fibers.

6. A separator according to claim 1, wherein the second layer is made of synthetic fibers.

7. A separator according to claim 1, wherein the second layer is made of cellulose fibers and of synthetic fibers.

8. A separator according to claim 1, wherein the thickness of the second layer is less than one-third of the total thickness of the separator.

9. A separator according to claim 1, wherein the overall relative density of the separator lies in the range 0.20 to 0.9.

10. A separator according to claim 1, wherein the separator is made of a single sheet of paper made up of at least three superposed layers.

11. A separator according to claim 1, comprising a first layer having a thickness of about 90 µm and a relative density of about 0.3, and a second layer having a thickness of about 10 µm and a relative density of about 0.8.

12. A separator according to claim 1, comprising a first layer having a thickness of about 76 µm and a relative density of about 0.3, and a second layer having a thickness of about 10 µm and a relative density of about 0.8.

13. A capacitor obtained using a separator according to claim 1.

* * * * *